United States Patent [19]

Komiya et al.

[11] Patent Number: 4,704,445
[45] Date of Patent: Nov. 3, 1987

[54] POLYURETHANE COMPOSITIONS

[75] Inventors: Yukiatsu Komiya; Koji Hirai, both of Kurashiki, Japan

[73] Assignee: Kuraray Co., Ltd., Kurashiki, Japan

[21] Appl. No.: 917,416

[22] Filed: Oct. 10, 1986

[30] Foreign Application Priority Data

Oct. 14, 1985 [JP] Japan .................................. 60-229077
Mar. 28, 1986 [JP] Japan .................................. 61-72220
Jun. 25, 1986 [JP] Japan .................................. 61-150156

[51] Int. Cl.$^4$ .............................................. C08G 18/42
[52] U.S. Cl. ......................................... 528/49; 528/73; 528/83
[58] Field of Search ............................ 528/49, 73, 83

[56] References Cited

U.S. PATENT DOCUMENTS 4,483,970 11/1984 Huntjens et al. ..................... 528/83

Primary Examiner—Maurice J. Welsh
Attorney, Agent, or Firm—Oblon, Fisher, Spivak, McClelland, & Maier

[57] ABSTRACT

Novel polyurethane compositions having excellent bond strength, thermal resistance and resistance to hot water are provided by a polymeric polyol and an organic polyisocyanate at a hydroxyl group/isocyanate group equivalent ratio (NCO/OH) of 1 to 10, wherein said polymeric polyol is a polyurethane polyol prepared from a polyester polyol and an organic diisocyanate, said polyurethane polyol having a number average molecular weight of 3,000 to 50,000, said polyester polyol being composed of the following structural unit $$-O-CH_2-CH_2-CH(CH_3)-CH_2-CH_2-O- \quad \text{(I)}$$

the following dicarboxylic acid structural unit $$-CO-(CH_2)_n-CO- \quad \text{(II)}$$

wherein n is an integer from 1 to 12, and the following dicarboxylic acid structural unit $$-CO-Ar-CO- \quad \text{(III)}$$

wherein Ar is the divalent residue of an aromatic hydrocarbon of 6 to 10 carbon atoms, and the molar ratio of structural unit (II) to structural unit (III) being in the range from 1/5 to 5/1, and said polyester polyol having a number average molecular weight of 600 to 8,000.

17 Claims, No Drawings

POLYURETHANE COMPOSITIONS

BACKGROUND OF THE INVENTION (1) Technical Field

This invention relates to new polyurethane compositions with high bond strength, thermal resistance and resistance to hot water. More particularly, it relates to new polyurethane compositions useful as adhesives, binders, coatings and paint for plastics, metals, rubber, textiles, and other materials.

(2) Description of the Prior Art

Multi-layer laminated film composed of plastic film (such as polyethylene, polypropylene, polyamides (nylon), polyesters, ethylene-vinyl acetate copolymers and saponified products thereof, polyvinyl chloride and Cellophane) and metal foils (such as aluminum foil) has been developed in recent years as packaging materials for foods and other goods, and is now placed in service in various fields.

Lamination is effected by various techniques, including dry lamination, wet lamination, hot-melt lamination and extrusion lamination.

With the recent changes in eating habits, types of foods packed in laminated film have become increasingly diversified, and this puts greater importance to various film lamination technologies. Accordingly, the types of adhesives required for the manufacture of laminated film have increased, and there has been a demand for higher adhesive performances; for example, good adhesion to a wide variety of materials (i.e., broader field of application), higher bond strength, flexibility, resistance to heat and hot water, better drying characteristics, and others.

Particularly, laminated film used for packaging retort foods and the like has shown marked expansion in recent years, and the adhesives used for the manufacture thereof require extermely high initial and final bond strength, hot water resistance and flexibility, as well as satisfactory properties against the foods to be packed. In order for these adhesives to be used also for general-purpose laminated film (e.g., laminated film for snack foods and the like), they must have good wettability to any types of film used and high-speed lamination characteristics, and must be transparent and highly resistant to hydrolysis and light. Polyurethane adhesives have been widely used as a type that meets these requirements to a greater or lesser extent. As polyurthanes, there are known polyurethane prepared from a polyisocyanate and an aromatic polyester or alphatic polyester such as polyethylene adipate or polybutylene adipate.

Conventional polyurethane adhesives, however, suffer from several disadvantages. Satisfactory wetting characteristics and flexibility can be achieved only at the sacrifice of the other properties. Poor wetting characteristics tend to result in repelling and partial adhesion failure; and if flexibility is insufficient, bonded film, when delaminated forcibly, peels off abruptly and sharply sometimes with a crunching sound. The same applies also to cold-temperature flexibility. Since all these requirements are not satisfied by a single adhesive as described above, a great variety of polyurethane adhesives have to be used for the manufacture of many types of laminated film products, providing diadvantages in terms of economy and production efficiency. Thus there is a demand for a new, high-performance polyurethane adhesive that can be used in a broader field of application. The same is true also in the fields of binders, paint and coatings.

SUMMARY OF THE INVENTION

Under the circumstances, we have tried to develop multipurpose polyurethane compositions which show good wetting characteristics to any type of substrates used, are excellent in initial and final adhesion, transparency, resistance to hot water and hydrolysis, and flexibility, and are therefore suitable as adhesives, binders, paint and coatings in many application fields. High flexibility herein means that bonded film, when delaminated forcibly peels off softly and gradually irrespective of the type of substrates.

We have discovered that this objects can be achieved by polyurthane compositions comprising a polymeric polyol (A) and an organic polyisocyanate (B) at a hydroxyl group/isocyanate group equivalent ratio (NCO-/OH) of 1 to 10, wherein said polymeric polyol is a polyurethane polyol prepared from a polyester polyol and an organic diisoyanate, said polyurethane polyol having a number average molecular weight of 3,000 to 50,000, said polyester polyol being composed of the following structureal unit

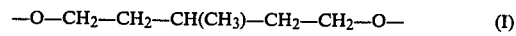

$$-O-CH_2-CH_2-CH(CH_3)-CH_2-CH_2-O- \quad (I)$$

the following dicarboxylic acid structural unit

$$-CO-(CH_2)_n-CO- \quad (II)$$

wherein n is an integer from 1 to 12, and the following dicarboxylic acid structural unit

$$-CO-Ar-CO- \quad (III)$$

wherein Ar is the divalent residue of an aromatic hydrocarbon of 6 to 10 carbon atoms, and the molar ratio of structural unit (II) to structural unit (III) being in the range from 1/5 to 5/1, and said polyester polyol having a number average molecular weight of 600 to 8,000.

DETAILED DESCRIPTION OF THE INVENTION

The polymeric polyol (A) used in the invention is a polyurethane polyol derived from a polyester polyol as the glycol component, said polyester polyol being composed of the structural unit (I), the dicarboxylic acid structural unit (II) and the dicarboxylic acid structural unit (III), and the molar ratio of structural unit (II) to structural unit (III) being in the range from 1/5 to 5/1.

In the polyester polyol used for the preparation of polyurethane polyol (A), the structural unit (I), $-O-CH_2-CH_2-CH(CH_3)-CH_2-CH_2-O-$, can be formed by the use of 3-methyl-1,5-pentanediol, $HO-CH_2-CH_2-CH(CH_3)-CH_2-CH_2OH$. Part of this diol may be replaced by other types of diols within limits not to nullify the intended purposes of the invention.

Diols that can be used for partial replacement include those having 2 to 12 carbon atoms, such as ethylene glycol, 1,4-butanediol, 1,6-hexanediol, 1,9-nonanediol, diethylene glycol and neopentyl glycol. It is also permissible to add, to diols mentioned above, a small amount of polyhydric alcohol, such as trimethylolpropane, glycerol and pentaerythritol. In any event, it is adivsable that the structural unit (I) be used in an amount more than 20 mol % of the total glycol component, preferably more than 30 mol %, more preferably more than 50 mol %, and most preferably more than 80 mol %.

The dicarboxylic structural units are represented by the following formulas (II) and (III),

—CO—(CH₂)ₙ—CO—                                    (II)

—CO—Ar—CO—                                           (III)

wherein $n$ is an integer from 1 to 12. Aliphatic dicarboxylic acids that can form the structural unit (II) include succinic acid, glutaric acid, adipic acid, azelaic acid, sebacic acid and dodecane-dicarboxylic acid. Of these, adipic, azelaic and sebacic acids are the most preferred. These dicarboxylic acids may be used either alone or in combination. Radical Ar in the structural unit (III) is a divalent residue of an aromatic hydrocarbon of 6 to 10 carbon atoms (i.e., a phenylene or napthylene radical). Aromatic dicarboxylic acids that can form the structural unit (III) include terephthalic acid, isophthalic acid, ortho-phthalic acid, 1,5-naphthalene-dicarboxylic acid, 2,5-naphtalene-dicarboxylic acid, 2,6-naphthalene-dicarboxylic acid and mixtures thereof. Of these, terephthalic acid and isophthalic acid are the most preferred. These aromatic dicarboxylic acids may also be used in the form of alkyl esters.

In the polyester polyol used in this invention, the molar ratio of the structural unit (I) to the sum of the structural units (II) and (III) may be any desired value insofar as the two terminal groups of the resulting polyester polyol are both hydroxyl groups. The molar ratio of the structural unit (II) to the structural unit (III), on the other hand, may vary depending on the use of the polyurethane compositions, but must be in the range from 1/5 to 5/1, and should preferably be in the range from ¼ to 4/1. For adhesives to be used in laminated film for retort foods, in particular, this molar ratio should be in the range ⅓ to 3/1, most preferably in the range from ½ to 2/1. If the molar ratio exceeds 5/1, the initial and final bond strength, as well as the resistance to heat and hot water, are low. When the molar ratio is less than 1/5, on the other hand, the wetting characteristics to various substrates, flexibilty and cold-temperature flexibility are poor.

Any known polycondensation techniques may be used for the manufacture of the polyester polyol of this invention. For example, the polyester polyol may be prepared by charging a reactor with compounds that can form the structural units (I), (II) and (III) at a desired mixing ratio, and subjecting the mixture to esterification or ester exchange reaction at 150° to 250° C. in the presence of an esterification catalyst and/or an ester exchange catalyst, followed by polycondensation at 200° to 300° C. under a high vacuum.

The polyester polyol must have a number average molecular weight in the range from 600 to 8,000, and should preferably be in the range from 1,000 to 2,500, most preferably in the range from 1,500 to 2,200. If the number average molecular weight is too low, the resulting polyurethane composition is insufficient in wetting characteristics; when the molecular weight is excessively high, on the other hand, adhesion to substrates, particularly to aluminum foils, is low.

The organic diisocyanates used in this invention are known aliphatic, alicyclic and aromatic diisocyanates, which include 4,4'-diphenylmethane diisocyanate, p-phenylene diisocyanate, tolylene diisocyanate, 1,5-naphthylene diisocyanate, xylene diisocyanate, hexamethylene diisocyanate, isophorone diisocyanate and 4,4'-dicyclohexylmethane diisocyanate. More preferable are those diisocyanates in which the two isocyanate groups involved have different reactivity, particualrly, siophorone diisocyanate, 2,4-tolylene dissocyanate and mixtures thereof. Furthermore, a small amount of a polyfunctional isocyanate, such as a triisocyanate prepared by reaction of trimethylolpropane or glycerol with three molar proportions of tolylene diisocyanate, may also be used in combination with the diisocyanates mentioned above.

Any known chain extender may also be used as required in the synthesis of polyurethane polyol from the above-mentioned polyester polyol and organic diisocyanate. Typical examples include ehtylene glycol, 1,4-butanediol, 1,6-hexanediol, xylene gloycl, 3-methyl-1,5-pentanediol, bishydroxyethoxy-benzene, neopentyl glycol, 1,9-nonanediol, isophorone diamine, hydrazine, dihydrazides, trimethylolpropane and glycerol.

Any known techniques may be used for the synthesis of the polyurethane polyol of the invention (See Japanese patent application; Tokkaisho Nos. 47-34494 or 48-101496, or our U.S. application; Ser. No. 826,595, now U.S. Pat. No. 4,639471). For example, a polyester polyol having a number average molecular weight in the range from 600 to 8,000, after being mixed as required with the extender, is preheated to a temperature of 40° to 100° C., an organic diisocyanate is admixed in such an amount that the equivalent ratio of isocyanate group to active hydrogen (NCO/OH) will be less than 1, and the mixture is heated at 50° to 120° C. for several hours to give a polyurethane polyol.

The above reaction may be carried out in an organic solvent inert to isocyanate group, or in the presence of a commonly used catalyst, such as organoetin compound and tertiary amines. When an organic solvent is used, its amount should preperably be such that the solid content of final reaction mixture will be in the range from 10 to 90 weight %, most preferably from 20 to 80 weight %.

The polyurethane polyol thus obtained, namely, the polymeric polyol (A) used in this invention, must have a number average molecular weight in the range from about 3,000 to 50,000, preferably in the range from 5,000 to 30,000. If the molecular weight is too low, the resulting polyurethane composition is poor in initial and final bond strength, resistance to hot water and chemical resistance; when the molecular weight is excessively high, on the other hand, the wetting characteristics are poor because of high viscosity.

In the polyurethane compositions of this invention, the polymeric polyol (A) must be a polyurethane polyol in order to ensure high initial and final bond strength, and high resistance to heat and hot water. For adhesives to be used in laminated film for packaging retort foods, in particular, this polyurethane polyol should preferably be the one prepared by reaction of a polyester polyol having a number average molecular weight in the range from 1,500 to 2,200 with an organic diisocyanate in which the two isocyanate groups involved have different reactivity. Bonding performances of polyurethane compositions derived from a polyester-urethane polyol depend greatly upon the structural unit (II) contained in said polyester polyol; the most preferred is the residue of sebacic acid, with the residue of adipic acid ranking next.

As examples of the organic polyisocyanate (B) used in this invention, may be mentioned compounds having three or four isocyanate groups in the molecule, for example, compounds prepared by reaction of a polyhydric alcohol (e.g., trimethylolpropane, glycerol and pentaerythritol) with excess diisocyanate (e.g., tolylene diisocyanate, xylylene diisocyanate and hexamethylene diisocyanate).

The compound (C) containing at least one hydroxyl group and at least one epoxy ring in the molecule includes, among others, reaction products of a polyhydric phenol, such as bisphenol A and tetrahydroxydiphenylethane, or a polyhydric alcohol, such as glycerol and pentaerythritol, with a polyfunctional halohydrine, such as epichlorohydrine; and reaction products thereof with a hydroxyl-containing compound, such as monoethanolamine. The suitable amount of compound (C) is about 1 to 30 weight % of the total composition, preferably about 3 to 20 weight %.

In the polyurethane compositions of this invention, the proportion of polymeric polyol (A), organic polyisocyanate (B) and compound containing hydroxyl group and epoxy ring (C) must be such that the equivalent ratio of total isocyanate groups to total hydroxyl groups (NCO/OH) is in the range from 1 to 10, preferably in the range from 1 to 6. If the equivalent ratio is less than 1, the resulting polyurethane composition will be poor in thermal resistance, causing delamination during retorting and drop in adhesiveness after retorting. When the equivalent ratio exceeds 10, on the other hand, bond strength and flexibility will be lower because of higher hardness due to increased isocyanate content and resultant stress concentration at the adhesive interface.

The most outstanding features of the polyurethane compositions of this invention are good wettability to any type of substrates, satisfactory working characteristics, and high initial and final bond strength, flexibility and hot water resistance. Said compositions are therefore suitable for use as adhesives, binders, paint and coatings; particularly, the above-mentioned features make the compositions best suited as adhesives.

The polyurethane compositions of this invention are suitable for bonding of thermoplastic resins, such as polyolefins (e.g., polyethylene and polypropylene), polystryene, ethylene/vinyl acetate copolymers and saponified products thereof, polyvinyl chloride, polyesters (e.g., polyethylene terephthalate and polybutylene terephthalate), polyamides (e.g., nylon) and polyurethanes; thermoset resins, such as phenol resins, melamine resins and urea resins; natural and synthetic rubbers; metals, such as copper and iron; and other materials, such as wood, glass and ceramics. The unique features mentioned above make the compositions usable in expanded applications, such as bonding of packaging materials for foods, medicines and other goods, adhesion of construction materials, electrical parts and automotive parts, lamination of textiles and plastic film, and many others. The particularly suitable applications are as adhesives for the film derived from saponified ethylene-vinyl acetate copolymers, and as adhesives for retort foods packaging materials, which must withstand high-temperature sterilization with hot water of 100° to 140° C., must be capable of storing foods (containing vinegar, salt and salad oil) over long periods, and therefore require lamination of metal foil (e.g., aluminum foil) and polyolefin film (e.g., polyester and polyamide) or lamination of polyolefin film and polyamide film (combinations of materials that are difficult to bond together).

The polyurethane compositions of this invention are applied by the method commonly used for two-pack type, curable adhesives. In a typical example, a polyurethane composition of this invention is applied to a surface of metal foil or plastic film by means of a dry laminator, the solvent is allowed to vaporize, two layers being laminated are put one upon another, and the applied composition is cured at room temperature or by the application of heat. The spread of adhesive on the surface of metal foil or plastic film is about 1 to 10 g/m² on dry basis.

EXAMPLES

The following examples will further illustrate this invention.

REFERENCE EXAMPLE 1 PREPARATION OF POLYURETHANE DIOL

A mixture of 3-methyl-1,5-pentanediol (105 g), dimethyl isophthalate (76.6 g), adipic acid (57.8 g) and tetraisopropoxy titanate (0.01 g) was subjected to esterification at 160° to 220° C. under a nitrogen gas stream. After the theoretical amounts of water and methanol were distilled off, the degree of vacuum was increased gradually by operating a vacuum pump to complete the reaction, giving a polyester diol with a molecular weight of 2,000 and an isophthalate/adipate molar ratio of 1/1. A mixture of this polyester diol (200 g), isophorone diisocyanate (18 g) and dibutyltin dilaurate (0.05 g) was heated at 80° C. for ten hours, and the reaction mixture was cooled and dissolved in 218 g ethyl acetate, affording 50 weight % solution of a polyester-urethane diol with a molecular weight of 10,000 (component A).

REFERENCE EXAMPLES 2 THROUGH 5

Ethyl acetate solutions of polyester-urethane diols (components B through E) were prepared in the same manner as in Reference Example 1 using diols and dicarboxylic acids in proportions as shown in table 1.

TABLE 1

| | | Reference Examples | | | | | Comp. Ex. | |
|---|---|---|---|---|---|---|---|---|
| | | 1 A | 2 B | 3 C | 4 D | 5 E | 1 F | 2 G |
| Polyester Diols | Dicarboxylic Acid (mol %) | | | | | | | |
| | IPA | 50 | | 25 | 23 | 50 | 50 | |
| | TA | | 50 | | | | | |
| | AD | 50 | 50 | 75 | | 50 | 50 | 100 |
| | Az | | | | 67 | | | |
| | Glycol (mol %) | | | | | | | |
| | MPD | 100 | 100 | 75 | 75 | 25 | | |
| | ND | | | | | 75 | | |
| | EG | | | 25 | 25 | | 25 | |
| | HG | | | | | | 75 | 100 |

TABLE 1-continued

|  |  | Reference Examples | | | | | Comp. Ex. | |
| --- | --- | --- | --- | --- | --- | --- | --- | --- |
|  |  | 1 | 2 | 3 | 4 | 5 | 1 | 2 |
|  |  | A | B | C | D | E | F | G |
|  | Molecular Weight | 2000 | 2000 | 2000 | 2000 | 2000 | 10000 | 2000 |
| PU | Use of IPDI | Yes | Yes | Yes | Yes | Yes | No | Yes |
|  | Molecular Weight | 10000 | 13000 | 15000 | 20000 | 12000 | — | 11000 |

IPA: Isophthalic acid
TA: Terephthalic acid
AD: Adipic acid
AZ: Azelaic acid
MPD: 3-Methyl-1,5-pentanediol
ND: 1,9-Nonanediol
EG: Ethylene glycol
HG: 1,6-Hexanediol
IPDI: Isophorone diisocyanate
PU: Polyurethane diol

COMPARATIVE EXAMPLES 1 AND 2

A polyester diol (component F) and a polyesterurethane diol (component G) were prepared in much the same manner as in Reference Example 1 using diols and dicarboxylic acids in proportions as shown in Table 1.

EXAMPLES 1 THROUGH 5 AND COMPARATIVE EXAMPLES 1 AND 2

Each of components A through G prepared above (100 parts by weight) was mixed with 5 parts of Coronate L (Nippon Polyurethane Industry; adduct of trimethylolpropane with three equivalent proportions of tolylene diisocyanate), or with Coronate HL (Nippon Polyurethane Industry; adduct of trimethylolpropane with three equivalent proportions of hexamethylene diisocyanate), and the mixture was diluted with ethyl acetate, giving a 20% adhesive solution. It was coated by means of a dry laminator on a surface of 12μ thick polyethylene terephthalate film (abbreviated as PET in Table 2) and 12μ thick undrawn polypropylene film treated with corona discharge (abbreviated as CPP in Table 2) to a dry add-on of about 3.0 g/m², the solvent was allowed to vaporize, and two sheets of coated film thus prepared were bonded together. The wetting characteristics of each adhesive solution was checked during this operation. Specimens (15 mm wide) were cut out from each laminated film thus obtained, and subjected to T-peel test at a pulling speed of 300 mm/min using a tensile tester to measure an initial bond strength. In addition, specimens were prepared from laminated film cured at 50° C. for three days, and tested fro final bond strength as well as hot water and chemical resistance according to the procedures given below. The results are summarized in Table 2.

Final bond strength
  T-peel test was conducted in the same manner as for initial bond strength.
Hot water and chemical resistance
  Hot water resistance was evaluated by treating specimens together with water in a 50-ml autoclave at 120° C. for five hours, subjecting the specimens thus treated to T-peel peel test, and observing the condition of peeling and measuring bond strength. Chemical resistance was evaluated by immersing specimens in 4% acetic acid at 25° C. for four weeks, and subjecting the specimens thus treated to T-peel test.
Flexibility
  Flexibility was evaluated according to the condition of peeling in the above tests. The marks shown in the table are:
  O: High and even peel strength; peels off softly and gradually.
  Δ: High peel strength observed locally; peels off easily in other areas.
  X: Low peel strength; peels off easily.
Wetting characteristics (observation):
  O: Evenly coated
  Δ: Locally repelled
  X: Pepelled

EXAMPLES 6 THROUGH 10 AND COMPARATIVE EXAMPLES 3 AND 4

Laminated film was prepared in the same maner as in Examples 1 through 5 and Comparative Examples 1 and 2, except that a 15μ thick aluminum foil (abbreviated as Al in Table 2) was used in place of undrawn polypropylene film. Their properties are also shown in Table 2.

TABLE 2

|  | Component | Curing agent | Substrate | Bond strength (=g/15 mm) | | | | Flexibility | Wetting characteristics |
| --- | --- | --- | --- | --- | --- | --- | --- | --- | --- |
|  |  |  |  | Initial | Final | Hot water resistance | Chemical resistance |  |  |
| Example 1 | A | Coronate L | PET—CPP | 300 | 780 | 800 | 750 | O | O |
| Example 2 | B | " |  | 790 | 760 | 760 | 730 | O | O |
| Example 3 | C | " |  | 750 | 830 | 840 | 800 | O | O |
| Example 4 | D | " |  | 700 | 790 | 790 | 740 | O | O |
| Example 5 | E | " |  | 650 | 830 | 850 | 830 | O | O |
| Comp. Ex. 1 | F | " |  | 500 | 630 | 600 | 590 | X | X |
| Comp. Ex. 2 | G | " |  | 40 | 500 | Delaminated | 100 | Δ | O |
| Example 6 | A | " | PET—Al | 800 | 1200 | 1240 | 1180 | O | O |
| Example 7 | B | " |  | 1050 | 1280 | 1300 | 1250 | O | O |
| Example 8 | C | " |  | 1200 | 1450 | 1450 | 1420 | O | O |
| Example 9 | D | " |  | 1100 | 1400 | 1400 | 1380 | O | O |
| Example 10 | E | " |  | 1000 | 1300 | 1320 | 1280 | O | O |
| Comp. Ex. 3 | F | " |  | 600 | 1000 | 700 | 650 | X | Δ |
| Comp. Ex. 4 | G | " |  | 200 | 700 | Delaminated | 200 | Δ | O |

REFERENCE EXAMPLES 6 THROUGH 16

Polyester diols with different molecular weights were prepared in much the same manner as in Reference Example 1 using diols and dicarboxylic acids shown in Table 3 in proportions as shown. Each of the polyester diols thus obtained was admixed with a diisocyanate listed in the table, and the mixture was treated in the same way as Reference Example 1. Each of the polyurethane diol (100 g) thus obtained was dissolved in 100 g ethyl acetate, giving solutions of polyurethane diols (components H through R).

EXAMPLES 11 THROUGH 21

Each of components H through R prepared above (100 parts by weight) was mixed with 5 parts by weight of Takenate D110N (Takeda Chemical Industries; adduct of trimethylolpropane with three equivalent proportions of mxylylene diisocyanate), Takenate D140N (Takeda Chemical Industries; adduct of trimethylolpropane with three equivalent proportions of isophorone diisocyanate) or a 1:1 mixture of Takenate D110N and Takenate D140N, and the resulting mixture was diluted with ethyl acetate, giving a 20% adhesive solution. It was coated by means of a dry laminator on a surface of 12μ thick polyethylene terephthalate film to a dry add-on of about 3.0 g/m², the solvent was allowed to vaporize, and a 9μ thick aluminum foil was laminated on the coated surface of polyethylene terephthalate film. The same adhesive solution as above was applied to the exposed surface of aluminum foil to a dry add-on of about 3.0 g/m², the solvent was allowed to vaporize, and 50μ thick undrawn polypropylene film treated with corona discharge was laminated on the coated surface of an aluminum foil. The wetting characteristics of each adhesive solution were checked during this operation. The properties of the laminated film thus prepared were measured in the same way as in Example 1. The results are summarized in Table 4.

TABLE 3

| | Reference Examples | | | | | | | | | | |
|---|---|---|---|---|---|---|---|---|---|---|---|
| Polyurethane Diols | 6 H | 7 I | 8 J | 9 K | 10 L | 11 M | 12 N | 13 O | 14 P | 15 Q | 16 R |
| Polyester Diols | | | | | | | | | | | |
| Dicarboxylic Acid (mol %) | | | | | | | | | | | |
| IPA | 50 | 70 | 50 | 30 | 50 | | | 50 | 50 | 50 | 50 |
| TA | | | | | | 30 | 50 | | | | |
| SBA | 50 | 30 | | | 50 | 70 | 50 | 50 | | | 50 |
| AD | | | 50 | 70 | | | | | 50 | 50 | |
| Glycol (mol %) | | | | | | | | | | | |
| MPD | 100 | 70 | 100 | 100 | 100 | 50 | 100 | 100 | 100 | 100 | 100 |
| HG | | 30 | | | | 50 | | | | | |
| Number Average M.W. | 1900 | 2000 | 1900 | 1800 | 2100 | 1600 | 2000 | 2500 | 1900 | 2400 | 1400 |
| Isocyanate: | | | | | | | | | | | |
| IPDI | Yes | Yes | | | | Yes | Yes | Yes | Yes | Yes | Yes |
| TDI | | | Yes | | Yes | | | | | | |
| MDI | | | | Yes | | | | | | | |
| Number Average M.W. | 17000 | 15000 | 12000 | 11000 | 14000 | 18000 | 16000 | 16000 | 13000 | 15000 | 12000 |

SBA: Sebacic acid
TDI: Tolylene diisocyanate
MDI: 4,4′-Diphenylmethane diisocyanate

TABLE 4

| | Component | Curing agent | Substrate | Bond strength (=g/15 mm) | | | | Flexibility | Wetting characteristics |
|---|---|---|---|---|---|---|---|---|---|
| | | | | Initial | Final | Hot water resistance | Chemical resistance | | |
| Example 11 | H | Takenate D140N | PET—Al—CPP | 900 | 1500 | 1600 | 1500 | O | O |
| Example 12 | I | Takenate D110N | (Al—CPP adhesiveness measured) | 1200 | 1800 | 1850 | 1750 | O | O |
| Example 13 | J | Coronate L | | 1000 | 1850 | 1800 | 1700 | O | O |
| Example 14 | K | " | | 800 | 1750 | 1700 | 1600 | O | O |
| Example 15 | L | " | | 1200 | 1600 | 1600 | 1550 | O | O |
| Example 16 | M | Takenate D110N Takenate D140N | | 900 | 1550 | 1550 | 1350 | O | O |
| Example 17 | N | " | | 1200 | 1700 | 1800 | 1600 | O | O |
| Example 18 | O | " | | 600 | 1000 | 900 | 750 | O | O |
| Example 19 | P | " | | 850 | 1100 | 950 | 900 | O | O |
| Example 20 | Q | " | | 650 | 700 | 700 | 700 | O | O |
| Example 21 | R | " | | 1100 | 1700 | 1700 | 1500 | O | Δ |

REFERENCE EXAMPLE 17

A mixture of 200 g polyester diol prepared from dimethyl isophthalate, adipic acid and 3-methyl-1,5-pentanediol (molecular weight: 2,000; isophthalate/adipate molar ratio: 1/1), 18 g isophorone diisocyanate and 0.05 g dibutyltine dilaurate was heated at 80° C. for 10 hours, and the reaction mixture was cooled and diluted with 218 g ethyl acetate, affording 50 weight % solution of a polyurethane diol (component S).

REFERENCE EXAMPLES 18 THROUGH 21

Ethyl acetate solutions of polyurethane diols (components T through W) were prepared in much the same manner as in Reference Example 17 using diols and dicarboxylic acids shown in Table 5 in proportions as shown.

COMPARATIVE EXAMPLES 5 AND 6

A polyester diol (component X) and polyurethane diol (component Y) were prepared in much the same manner as in Reference Example 17 using diols and dicarboxylic acid shown on Table 5 in proportions as shown.

EXAMPLES 22 THROUGH 26 AND COMPARATIVE EXAMPLES 5 AND 6

Each of components S through Y prepared above (100 parts by weight) was mixed with 10 parts of an epoxy compound [Epikote #834 (molecular weight: 470) or Epikote #1001 (molecular weight: 900); Yuka-Shell Inc.] and 5 parts of Takenate D110N (Takeda Chemical Industries; adduct of trimethylolpropane with three equivalent proportions of m-xylylene diisocyanate), Takenate D140N (Takeda Chemical Industries; adduct of trimethylolpropane with three equivalent proportions of isophorone diisocyanate) or a 1:1 mixture of takenate D110N and Takenate D140N, and the resulting mixture was diluted with ethyl acetate, giving a 20% adhesive solution. It was coated by means of a dry laminator on a surface of 12μ thick polyethylene terephthalate film (abbreviated as PET in Table 6) to a dry add-on of about 3.0 g/m², the solvent was allowed to vaporize, and a 9μ thick aluminum foil (abbreviated as Al in Table 6) was laminated on the coated surface of polyethylene terephthalate film. The same adhesive solution as above was applied to the exposed surface of the aluminum foil to a dry add-on of about 3.0 g/m², the solvent was allowed to vaporize, and 50μ thick undrawn polypropylene film treated with corona discharge (abbreviated as CPP in Table 6) was superimposed on the coated surface of the aluminum foil. The wetting characteristics of each adhesive solution was checked during this operation. Similarly, biaxially oriented film of an ethylene/vinyl acetate copolymer (Eval XL; Kuraray Co., Ltd.; abbreviated as EVAL in Table 6) was bonded to undrawn polypropylene film. The laminated film thus prepared was subjected to T-peel test on a tensile tester at a pulling speed of 5 mm/min to measure an initial bond strength. Specimens were prepared from the laminated film cured at 50° C. for three days, and the properties were measured in the same manner as in Example 1. The results are summarized in Table 6.

TABLE 5

|  | Reference Examples |  |  |  |  | Comp. Ex. |  |
|---|---|---|---|---|---|---|---|
|  | 17 | 18 | 19 | 20 | 21 | 5 | 6 |
| Polyurethane Polyol | S | T | U | V | W | X | Y |
| Polyester Diol |  |  |  |  |  |  |  |
| Dicarboxylic Acid (mol %) |  |  |  |  |  |  |  |
| IPA | 50 | 50 |  | 50 | 20 | 50 |  |
| TA |  |  | 70 |  | 30 |  |  |
| AD | 50 |  |  |  |  | 50 | 100 |
| SBA |  | 50 | 30 | 50 | 50 |  |  |
| Glycol (mol %) |  |  |  |  |  |  |  |
| MPD | 100 | 50 | 100 | 100 | 75 |  |  |
| NPG |  |  |  |  |  | 75 |  |
| EG |  | 50 |  |  | 25 | 25 | 100 |
| Number Average M.W. | 2000 | 2000 | 2000 | 1600 | 1800 | 2000 | 2000 |
| Isocyanate |  |  |  |  |  |  |  |
| IPDI | Yes |  |  | Yes | Yes |  | Yes |
| TDI |  | Yes |  |  |  |  |  |
| MDI |  |  | Yes |  |  |  |  |
| Number Average M.W. | 10000 | 15000 | 20000 | 15000 | 13000 | 10000 | 10000 |

NPG: Neopentyl glycol

TABLE 6

|  | Polymeric polyol (A) | Organic isocyanate (B) | Epoxy compound (C) | Substrate | Bond strength (=g/15 mm) | | | | Flexi-bility | Wetting characteristics |
|---|---|---|---|---|---|---|---|---|---|---|
|  |  |  |  |  | Initial | Final | Hot water resistance | Chemical resistance |  |  |
| Example 22 | S | Takenate D110N | Epikote #834 | PET/Al/CPP | 650 | 850 | 850 | 850 | O | O |
| Example 23 | T | Takenate D110N | Epikote #834 |  | 850 | 1000 | 1000 | 1000 | O | O |
| Comp. Ex. 5 | X | Takenate D110N | Epikote #834 |  | 450 | 600 | 400 | 300 | X | Δ |
| Comp. Ex. 6 | Y | Takenate D140N | Epikote #834 |  | 100 | 300 | 150 | 150 | Δ | O |
| Example 24 | U | Takenate D110N Takenate D140N | Epikote #1001 Epikote #1001 | EVAL/CPP | 750 | 900 | 900 | 900 | O | O |
| Example 25 | V | Takenate D110N Takenate D140N | Epikote #1001 Epikote #1001 |  | 650 | 850 | 900 | 850 | O | O |
| Example 26 | W | Takenate D110N Takenate D140N | Epikote #1001 Epikote #1001 |  | 650 | 800 | 850 | 850 | O | O |

What is claimed is:

1. Polyurethane compositions comprising a polymeric polyol (A) and an organic polyisocyanate (B) at a hydroxyl group/isocyanate group equivalent ratio (NCO/OH) of 1 to 10, wherein said polymeric polyol (A) is a polyurethane polyol prepared from a polyester polyol and an organic diisocyanate, said polyurethane polyol having a number average molecular weight of 3,000 to 50,000, said polyester polyol being composed of the following structureal unit $$-O-CH_2-CH_2-CH(CH_3)-CH_2-CH_2-O- \qquad (I)$$

the following dicarboxylic acid structural unit $$-CO-(CH_2)_n-CO- \qquad (II)$$

wherein n is a integer from 1 to 12, and the following dicarboxylic acid structural unit $$-CO-Ar-CO- \qquad (III)$$

wherein Ar is the divalent residue of an aromatic hydrocarbon of 6 to 10 carbon atoms, and the molar ratio of structural unit (II) to structural unit (III) being in the range from 1/5 to 5/1, and said polyester polyol having a number average molecular weight of 600 to 8,000.

2. The polyurethane compositions as defined in claim 1, wherein a compound having at least one hydroxyl group and at least one epoxy ring in the molecule (C) is further contained.

3. The polyurethane compositions as defined in claim 1 or 2, wherein said polymeric polyol (A) is a polyurethane polyol prepared from a polyester diol and an organic diisocyanate, said polyurethane polyol having a number average molecular weight of 3,000 to 50,000, said polyester diol being composed of the following structureal unit $$-O-CH_2-CH_2-CH(CH_3)-CH_2-CH_2-O- \qquad (I)$$

the following dicarboxylic acid structural unit $$-CO-(CH_2)_n-CO- \qquad (II)$$

wherein n is an integer from 1 to 12, and the following dicarboxylic acid structural unit $$-CO-Ar-CO- \qquad (III)$$

wherein Ar is the divalent residue of an aromatic hydrocarbon of 6 to 10 carbon atoms, and the molar ratio of structural unit (II) to structural unit (III) being in the range from 1/5 to 5/1, and said polyester polyol having a number average molecular weight of 1,500 to 2,200.

4. The polyurethane compositions as defined in any of claims 1 through 3, wherein said organic diisocyanate is composed mainly of isophorone diisocyanate or 2,4-tolylene diisocyanate.

5. The polyurethane compositions as defined in any of claims 1 through 4, wherein said structural unit (II) is the residue of sebacic acid or adipic acid.

6. The polyurethane compositions as defined in any of claims 1 through 5, wherein said structural unit (III) is the residue of terephthalic acid or isophtalic acid.

7. The polyurethane compositions as defined in any of claims 1 through 6, wherein the molar ratio of structural unit (II) to structural unit (III) is in the range from ½ to 2/1.

8. The polyurethane composition as defined in any of claims 1 to 7, wherein said compound (C) having at least one hydroxyl group and at least one epoxy ring in the molecule is a reaction product of a polyhydric phenol or polyhydric alcohol with a polyfunctional halohydrine or a reaction product thereof with a hydroxyl-containing compound.

9. The polyurethane compositions as defined in claim 8, wherein said polyhydric phenol is bisphenol A or tetrahydroxydiphenylethane.

10. The polyurethane compositions as defined in claim 8, wherein said polyhydric alcohol is glycerol or pentaerythritol.

11. The polyurethane compositions as defined in claim 8, wherein said polyfunctional halohydrine is epichlorohydrine.

12. Adhesive compositions comprising a polymeric polyol (A) and an organic polyisocyanate (B) at a hydroxyl group/isocyanate group equivalent ratio (NCO-/OH) of 1 to 10, wherein said polymeric polyol (A) is a polyurethane polyol prepared from a polyester polyol and an organic diisocyanate, said polyurethane polyol having a number average molecular weight of 3,000 to 50,000, said polyester polyol being composed of the following structureal unit $$-O-CH_2-CH_2-CH(CH_3)-CH_2-CH_2-O- \qquad (I)$$

the following dicarboxylic acid structural unit $$-CO-(CH_2)_n-CO- \qquad (II)$$

wherein n is an integer from 1 to 12, and the following dicarboxylic acid structural unit $$-CO-Ar-CO- \qquad (III)$$

wherein Ar is the divalent residue of an aromatic hydrocarbon of 6 to 10 carbon atoms, and the molar ratio of structural unit (II) to structural unit (III) being in the range from 1/5 to 5/1, and said polyester polyol having a number average molecular weight of 600 to 8,000.

13. The adhesive compositions as defined in claim 12, wherein a compound having at least one hydroxyl group and at least one epoxy ring in the molecule (C) is further contained.

14. The adhesive compositions as defined in claim 12 or 13, wherein said organic diisocyanate is composed mainly of isophorone diisocyanate or 2,4-tolylene diisocyanate.

15. The adhesive compositions as defined in any of clims 12 through 14, wherein said structural unit (II) is the residue of sebacic acid or adipic acid.

16. The adhesive compositions as defined in any of claims 12 through 15, wherein said structural unit (III) is the residue of terephtalic acid or isophthalic acid.

17. The adhesive compositions as defined in any of claims 12 through 16, wherein said molar ratio of structural unit (II) to structural unit (III) is in range from ½ to 2/1.

* * * * *